(12) United States Patent
Wang

(10) Patent No.: US 7,380,417 B2
(45) Date of Patent: Jun. 3, 2008

(54) CONTINUOUS FORMING SYSTEM FOR PRODUCING LENSES

(75) Inventor: Meng-Kun Wang, Taichung (TW)

(73) Assignee: Asia Optical Co., Inc., T.E.P.Z., Taichung (TW)

( * ) Notice: Subject to any disclaimer, the term of this patent is extended or adjusted under 35 U.S.C. 154(b) by 415 days.

(21) Appl. No.: 11/109,564

(22) Filed: Apr. 19, 2005

(65) Prior Publication Data

US 2006/0042320 A1    Mar. 2, 2006

(30) Foreign Application Priority Data

Aug. 10, 2004  (TW) .............................. 93123909 A

(51) Int. Cl.
  *C03B 11/04*    (2006.01)
(52) U.S. Cl. ............................ 65/246; 65/227; 65/260; 65/361
(58) Field of Classification Search ................. 65/246, 65/227, 78, 260, 165, 357–361
  See application file for complete search history.

(56) References Cited

U.S. PATENT DOCUMENTS 2,424,235 A * 7/1947 Hoffer ...................... 249/53 R
4,148,954 A * 4/1979 Smarook ..................... 428/116
5,013,348 A * 5/1991 Hirota .......................... 65/102
5,173,100 A * 12/1992 Shigyo et al. ................. 65/102
5,246,476 A * 9/1993 Yoshimura et al. ......... 65/29.19
5,306,324 A * 4/1994 Vehmas et al. ................ 65/104
5,322,541 A * 6/1994 Shimizu et al. ................ 65/66
5,974,836 A * 11/1999 Radermacher et al. ......... 65/273
6,698,241 B1 * 3/2004 Schwarzer ................. 65/29.12
7,131,562 B2 * 11/2006 Ueyama et al. ............ 225/96.5
7,159,420 B2 * 1/2007 Autery et al. .................. 65/66

* cited by examiner

*Primary Examiner*—Steven P. Griffin
*Assistant Examiner*—DeMaris R. Wilson
(74) *Attorney, Agent, or Firm*—McNees Wallace & Nurick, LLC

(57) ABSTRACT

A glass forming system includes a first rotating device disposed in a first processing station defining a reception region, a first heating region, a first transfer region and a first cooling region, and a second rotating device disposed in a second processing station defining a second transfer region, a second heating region, a forming region and a second cooling region. The second rotating device holds at least one forming unit and is turnable to move the forming unit between the regions of the second processing station. The first rotating device holds at least one sleeve member which is movable between the first and second rotating devices and mountable on the forming unit. The first rotating device is turnable to move the sleeve member between the regions of the second processing station.

13 Claims, 20 Drawing Sheets

CONTINUOUS FORMING SYSTEM FOR PRODUCING LENSES

CROSS-REFERENCE TO RELATED APPLICATION

This application claims priority from Taiwanese Invention Patent Application No. 93123909, filed on Aug. 10, 2004.

BACKGROUND OF THE INVENTION

1. Field of the Invention

This invention relates to a forming system for forming glass, more particularly to a continuous forming system for producing optical lenses.

2. Description of the Related Art

Referring to FIG. 1, a typical forming system for producing optical glasses, includes a forming room 1, a first standby zone 2 adjacent to an entrance of the forming room 1, two successive heating zones 3 disposed in the forming room 1 adjacent to the first standby zone 2, two successive forming zones 4 disposed in the forming room 1 adjacent to the heating zones 3, three successive cooling zones 5 disposed in the forming room 1 adjacent to the forming zones 4, a second standby zone 6 disposed adjacent an exit of the forming room 1 immediately downstream of the cooling zones 5, a third standby zone 7 downstream of the second standby zone 6, a separation zone 8 downstream of the third standby zone 7, a replacement zone 9 downstream of the separation zone 8, an assembly zone 101 downstream of the replacement zone 9, a fourth standby zone 102 disposed between the first standby zone 2 and the assembly zone 101, a suction nozzle 103 disposed adjacent the replacement zone 9 for sucking lens or glass blanks, and fourteen sets of forming units 104 disposed respectively in the aforesaid zones. Each forming unit 104 includes a sleeve member 1041, a lower molding core 1042 disposed in the sleeve member 1041 for holding a glass blank 105, and an upper molding core 1043 movably disposed in the sleeve member 1041 above the lower molding core 1042.

When a continuous production operation of lenses starts in the forming system, the forming units 104 together with glass blanks 105 thereon are moved successively from the first standby zone 2 to the heating zones 3 to soften the glass blanks 105. Thereafter, the forming units 104 are moved one after the other to the forming zones 4 for press-forming the glass blanks 105 into lenses 106, and further to the cooling zones 5 to cool down the lenses 106. Afterwards, the forming units 104 together with the lenses 106 are moved successively to the second standby zone 6 where the forming units 104 are picked up by a robot arm (not shown) one after the other to the third standby zone 7. The forming units 104 with the lenses 106 are then moved to the separation zone 8 at which each upper molding core 1043 is separated from the corresponding lower molding core 1042 and from which each lower molding core 1042 with the corresponding sleeve member 1041 is moved to the next replacement zone 9. At this stage, the suction nozzle 103 is moved downward to pick up the lens 106 from each lower molding core 1042 for removal to a storage region (not shown), and then brings a glass blank 105 from another storage region to each lower molding core 1042. Each glass blank 105 is then brought by the corresponding lower molding core 1042 and sleeve member 1041 to the assembly zone 101 where a robot arm (not shown) is used to assemble each lower molding core 1042 with another upper molding core 1043. Finally, each forming unit 104 together with the glass blank 105 is moved to the fourth standby zone 102 and then resent to the first standby zone 2 for continuous operation.

In the aforesaid forming system, since separation and assembly of each forming unit 104 are carried out separately at two different zones, i.e. the separation and assembly zones 8 and 101, additional operation steps are necessary to transfer the forming units 104 between the two zones, thus increasing the complexity of the operation and the construction of the system and adversely affecting the production rate. In addition, the need to perform aligning and positioning of the components of each forming unit 104 in each of the two zones also complicates the forming system. Furthermore, it is difficult to center the glass blank 105 with respective to the central axis of the sleeve member 1041 of the forming unit 104 so that the glass blank 105 is vulnerable to positional deviation when being transferred to the replacement zone 9, or to the assembly zone 101 from the replacement zone 9. The positional deviation can result in defective products with asymmetric thickness.

SUMMARY OF THE INVENTION

An object of the present invention is to provide an efficient and inexpensive glass forming system which can address the problems encountered by the above-described prior art.

According to this invention, a continuous forming system for glass, comprises: a first processing station defining a reception region, a first heating region, a first transfer region, and a first cooling region which are arranged successively along a first angular direction, and including a first rotating device rotatable along the first angular direction to move through the reception region, the first heating region, the first transfer region, and the first cooling region; and a second processing station defining a second transfer region, at least one second heating region, at least one forming region and at least one second cooling region which are arranged successively along a second angular direction, and including a second rotating device for rotating along the second angular direction to move through the second transfer region, the second heating region, the forming region and the second cooling region. The second rotating device includes a lower rotary part and an upper rotary part disposed above the lower rotary part. The forming system further includes a forming device which has at least one forming unit which is mounted on the second rotating device for moving between the second transfer region, the second heating region, the forming region, and the second cooling region. The forming device further includes at least one sleeve member which is mountable on the first rotating device for moving between the reception region, the first heating region, the first transfer region and the first cooling region and which is movable to the second rotating unit for cooperating with the forming unit. The forming unit has a lower mold unit mounted on the lower rotary part, and an upper mold unit mounted on the upper rotary part to move toward and away from the lower mold unit. The sleeve member is mountable between the lower and upper mold units and includes at least one sleeve wall defining a slot, the sleeve wall having a first shoulder face formed around the slot and adapted to support a glass blank, and a second shoulder face formed around the slot above the first shoulder face and adapted to support a lens. A pick-up device is provided between the first and second transfer regions and between the first and second rotating devices to transfer the sleeve member between the first and second rotating devices.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
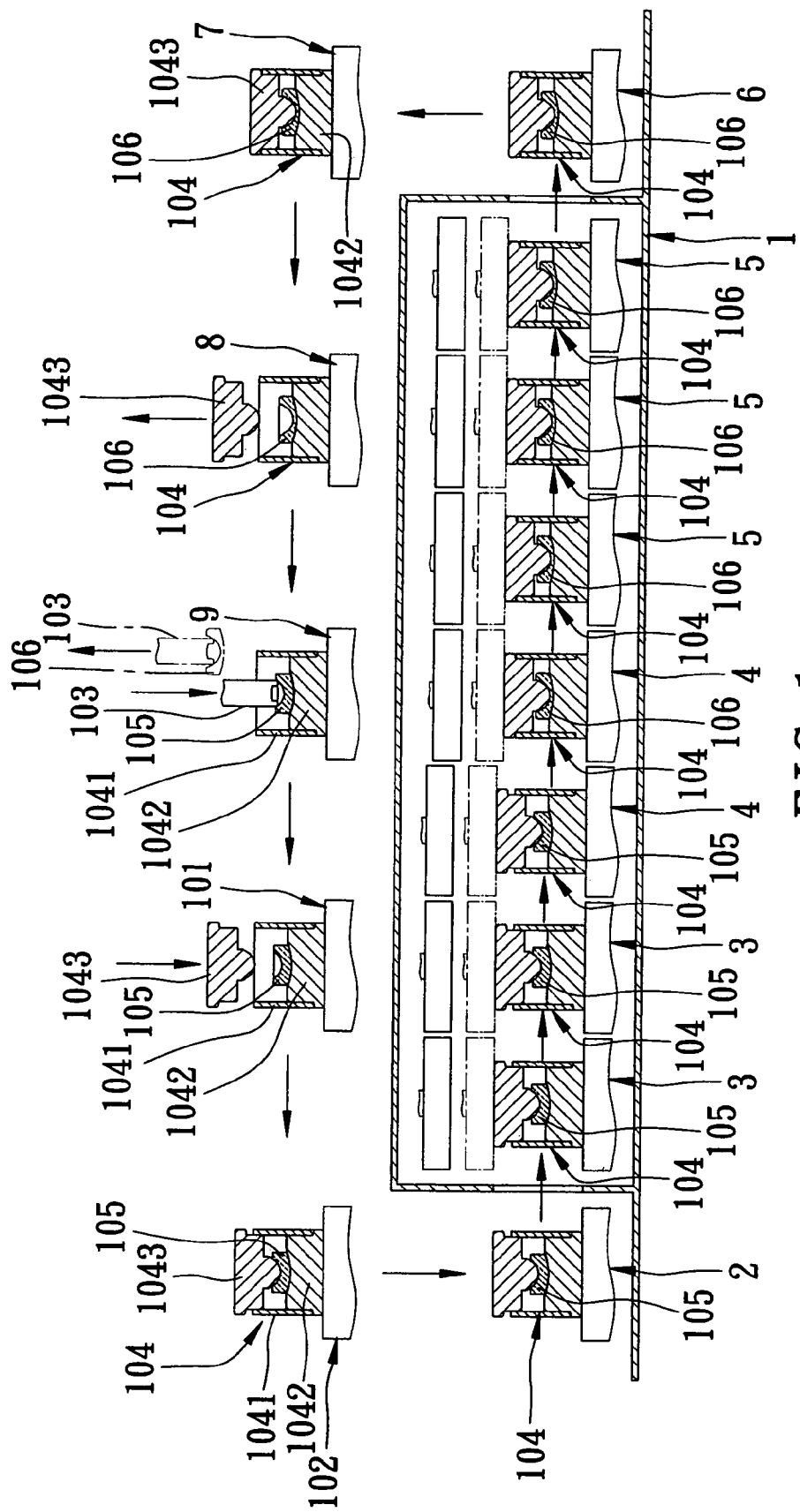
FIG. 1 is a conventional forming system for producing lens.

Before the present invention is described in greater detail, it should be noted that same reference numerals have been used to denote like elements throughout the specification.

Figure 2:
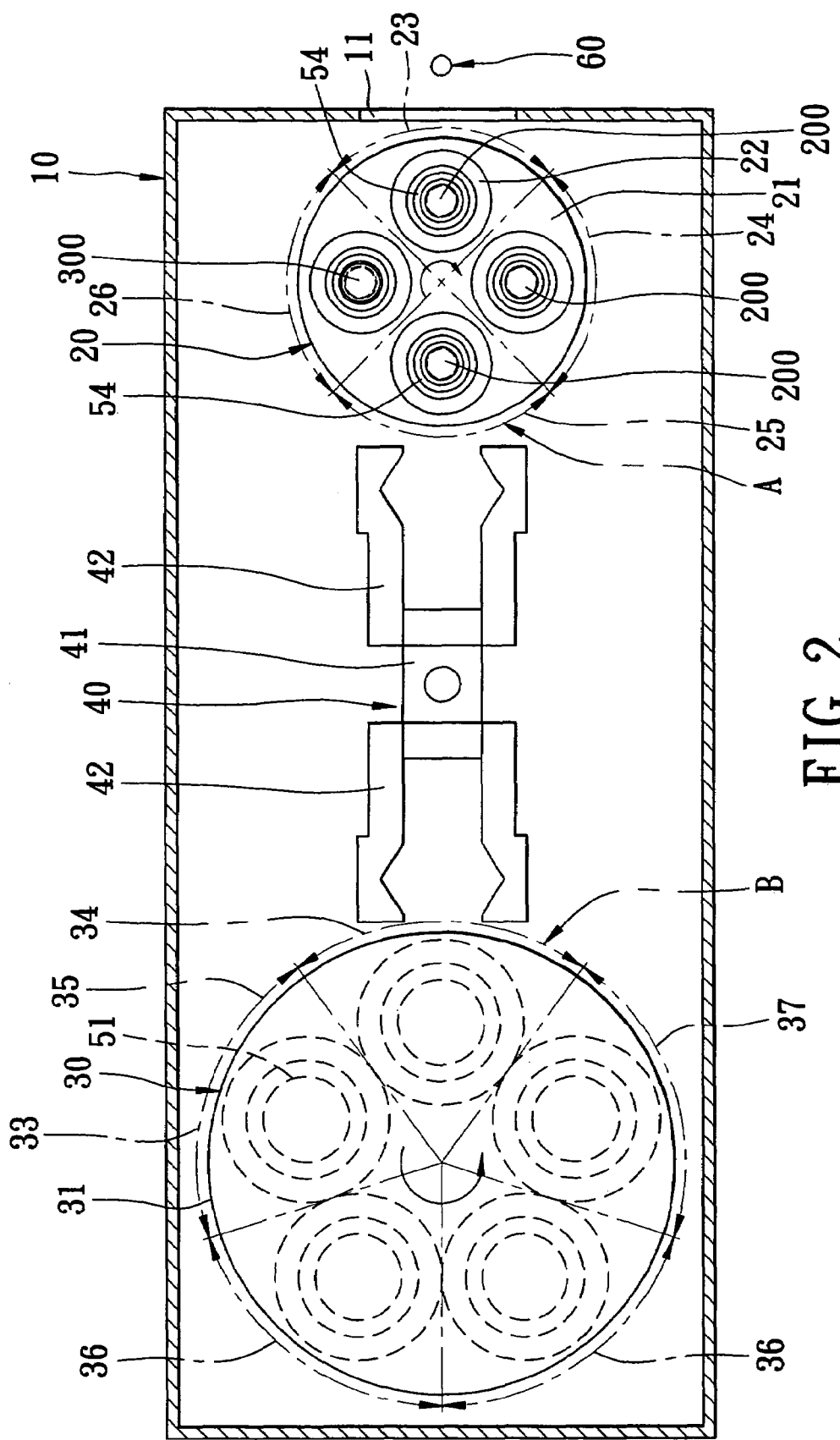
FIG. 2 is a schematic top plan view of a forming system embodying the present invention.
Figure 3:
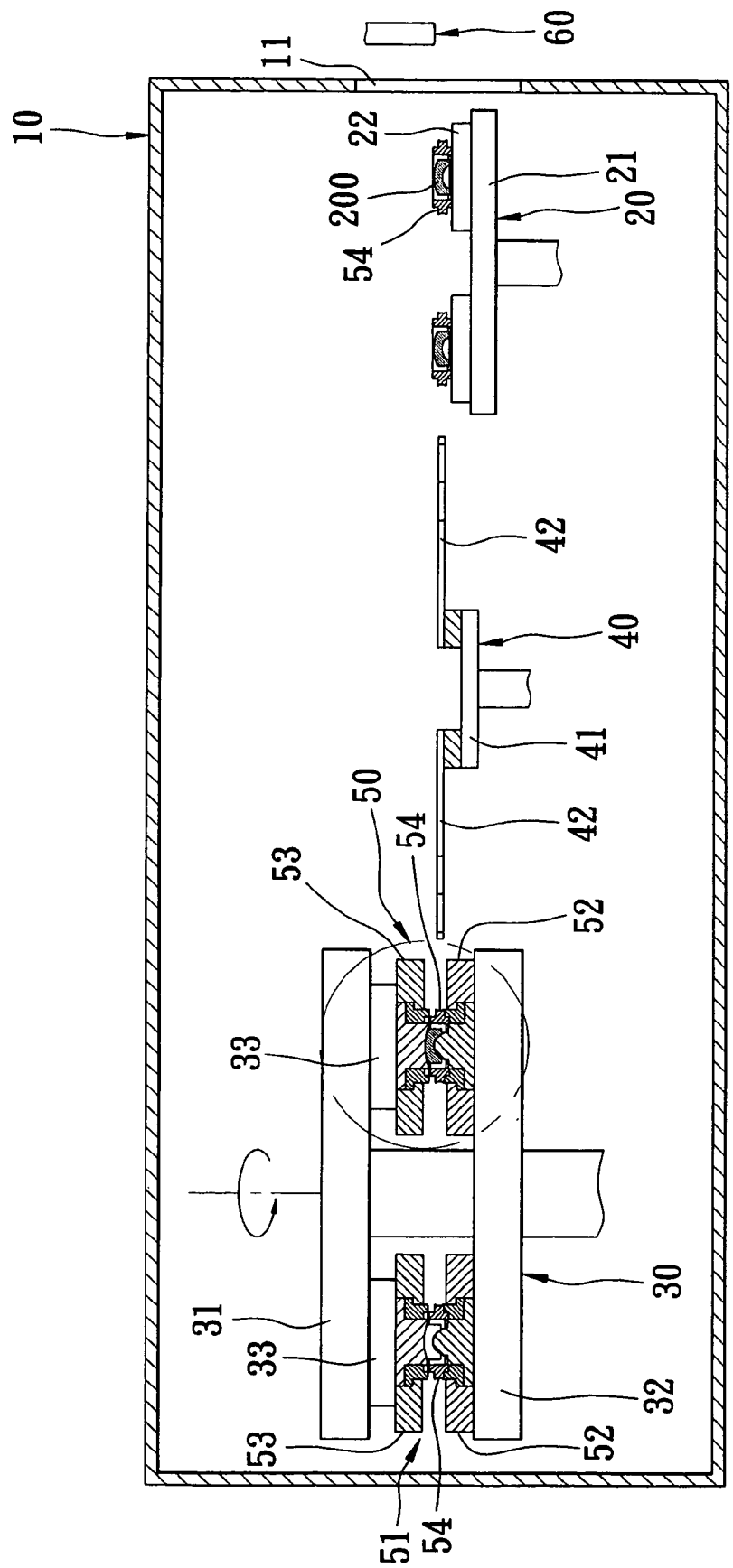
FIG. 3 is a schematic elevation view of the forming system showing that a forming unit is moved to a second heating region from a second transfer region.
Figure 4:
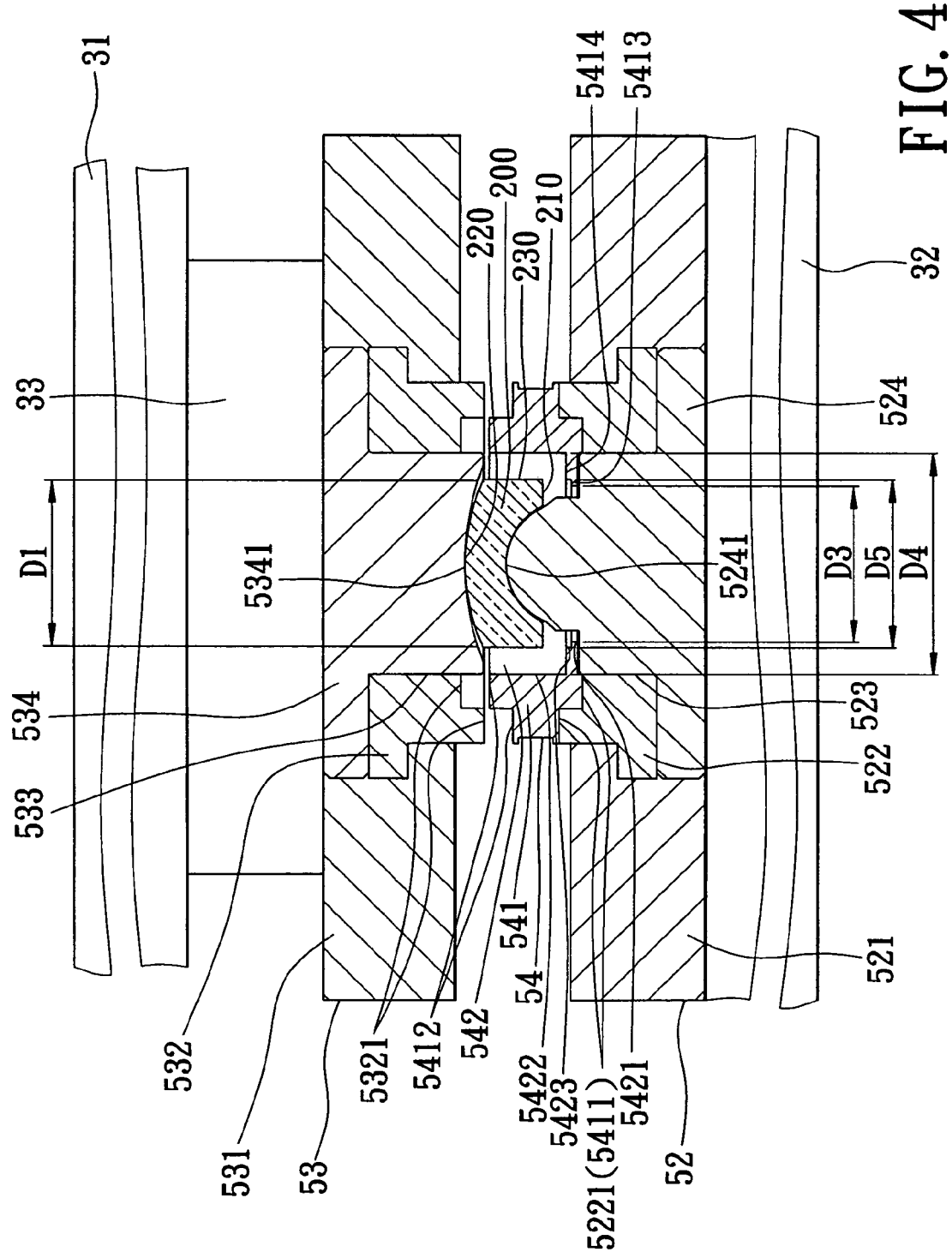
FIG. 4 is an enlarged view of an encircled portion of the forming system of FIG. 2.
Figure 6:
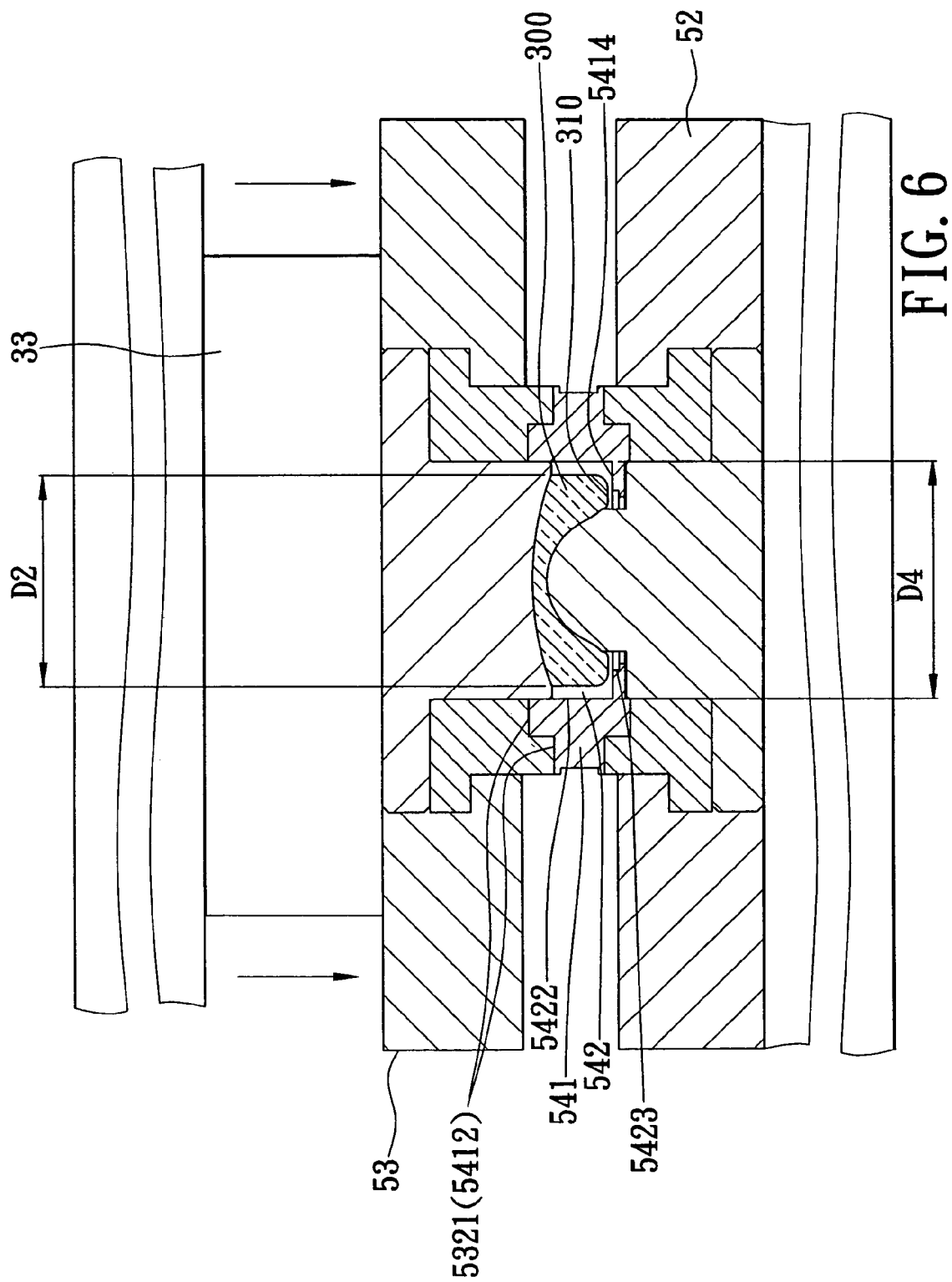
FIG. 6 is an enlarged view of an encircled portion of FIG. 5 showing that a lens has been formed in the forming unit.

Referring to FIGS. 2 and 3, a forming system embodying the present invention is used to form a plurality of glass blanks 200 of small diameter (D1) into lenses 300 of large diameter (D2) (see FIGS. 4 and 6). Each glass blank 200 has a bottom face 210, a top face 220, and a peripheral face 230 interconnecting the bottom and top faces 210 and 220. The forming system includes a forming room 10, a first rotating device 20, a second rotating device 30, a pick-up device 40, a forming device 50, and a suction device 60.

The forming room 10 has an entrance opening 11. A first processing station (A) is provided within the forming room 10 and defines a first reception region 23 adjacent to the entrance opening 11 of the forming room 10, a first heating region 24, a first transfer region 25, and a first cooling region 26, which are arranged angularly and successively along a first angular direction. The first processing station (A) includes the first rotating device 20 which is rotatable along the first angular direction. In this embodiment, the first rotating device 20 is rotated intermittently in a clockwise direction.

The first rotating device 20 includes a disk body 21 and four support plates 22 disposed on the disk body 21, respectively, at four spaced-apart angular positions which correspond to the positions of the reception, first heating, first transfer, and first cooling regions 23, 24, 25 and 26, respectively.

A second processing station (B) is disposed in the forming room 10 and defines a second transfer section 34 in alignment with the first transfer section 25, a second heating region 35, two forming regions 36 and a second cooling region 37 which are arranged angularly and successively along a second angular direction. The second rotating device 30 is rotatable along the second angular direction in the second processing station (B). In this embodiment, the second rotating device 30 is turned intermittently in a counterclockwise direction. The second rotating device 30 includes an upper rotary part 31, a lower rotary part 32, five drive members 33 disposed angularly at equal intervals at the bottom side of the upper rotary part 31. The drive members 33 are movable downward and upward and are preferably operated by hydraulic power units.

The pick-up device 40 is disposed between the first transfer region 25 and the second transfer region 34 and between the first and second rotating devices 20 and 30. In this embodiment, the pick-up device 40 includes a double-clamp mechanical claw, which has a rotatable main body 41 movable upward and downward, and two clamps 42 mounted on the main body 41.

The forming device 50 includes a plurality of forming units 51. Specifically, five forming units 51 are mounted angularly on the upper and lower rotary parts 31 and 32 at intervals corresponding to the locations of the second transfer region 34, the second heating region 35, the forming regions 36 and the second cooling region 37. As the upper and lower rotary parts 31 and 32 rotate, each forming unit 51 can circulate through the second transfer region 34, the second heating region 35, the forming regions 36 and the second cooling region 37 of the second rotating device 30. Each forming unit 51 includes a lower mold unit 52 mounted on the lower rotary part 32, and an upper mold unit 53 mounted on a corresponding one of the drive members 33 which are installed on the upper rotary part 31 of the second rotating device 30.

The forming device 50 further includes a plurality of sleeve members 54 which are movable between the first and second rotating devices 20 and 30 and each of which can be placed between the lower and upper mold units 52, 53 of one of the forming units 51. In this embodiment, four sleeve members 54 are provided on the first rotating device 20, whereas five sleeve members 54 are provided on the second rotating device 30. When each sleeve member 54 is transferred from the first rotating device 20 to the second rotating device 30, it is assembled removably between the lower and upper mold units 52 and 53 of one of the forming units 51.

Specifically, four sleeve members 54 are mounted respectively on the support plates 22 of the first rotating device 20 corresponding to the positions of the reception region 23, the first heating region 24, the first transfer region 25 and the first cooling region 26. The sleeve members 54 on the first rotating device 20 have the same construction as that of the sleeve members 54 on the second rotating device 30. As the rotary body 21 turns, the sleeve members 54 can circulate through the reception region 23, the first heating region 24, the first transfer region 25 and the first cooling region 26.

Figure 5:
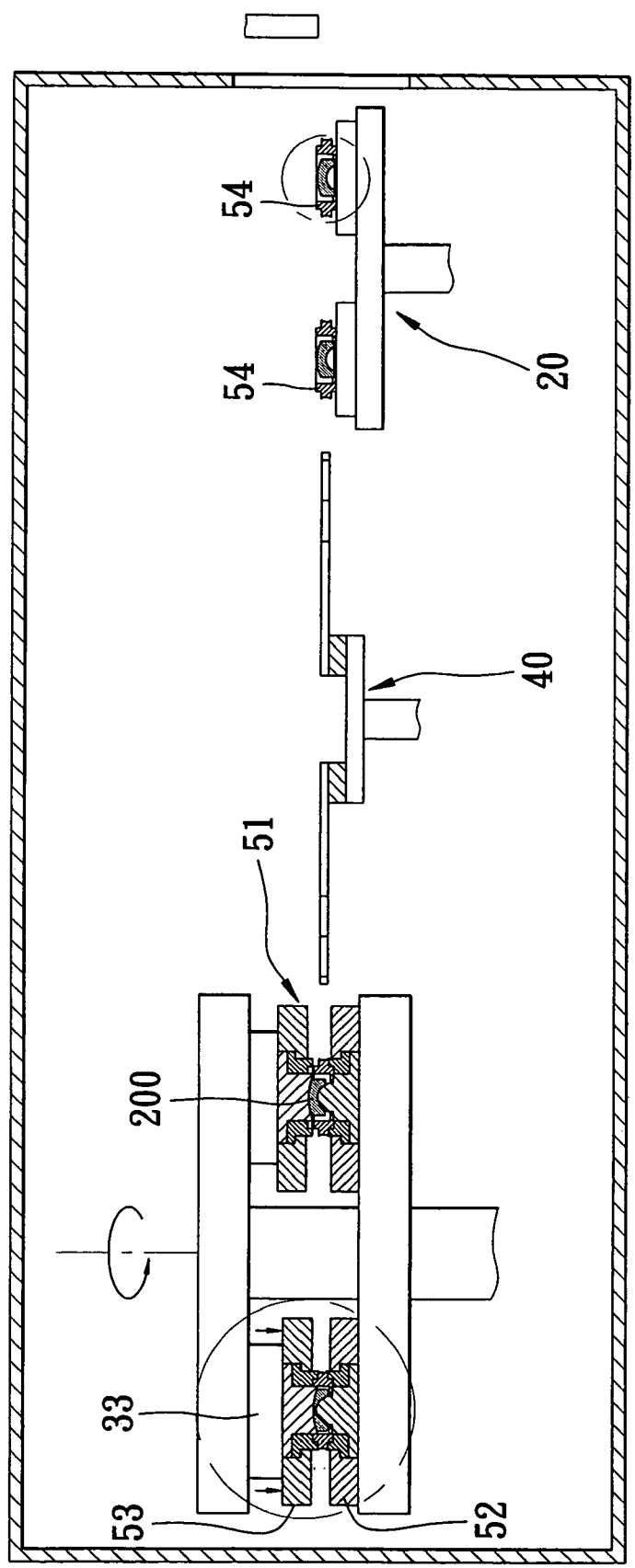
FIG. 5 is the same view as FIG. 3 but with the forming unit being moved to a forming region from the second heating region.

Since the forming units 51 are identical, the construction thereof will be explained hereinafter based on one of the forming units 51. Referring to FIGS. 4 to 6, the lower mold unit 52 includes a lower hollow support 521 disposed on top of the lower rotary part 32, a lower socket member 522 mounted inside the lower hollow support 521 and defining a socket hole 523, and a lower molding core 524 inserted into the socket hole 523. The lower socket member 522 has a first abutment face 5221, whereas the lower molding core 524 has a first forming face 5241. In this embodiment, the first forming face 5241 is provided on top of the lower molding core 524, whereas the abutment face 5221 is formed on top of the lower socket member 522 around the first forming face 5241.

The upper mold unit 53 includes an upper hollow support 531 mounted on the corresponding drive member 33, an upper socket member 532 mounted inside the upper hollow support 531 and defining a socket hole 533, and an upper molding core 534 inserted into the socket hole 533. The drive member 33 is used to move the upper molding core 534 toward or away from the lower molding core 524. The upper socket member 532 has a second abutment face 5321, whereas the upper molding core 534 has a second forming face 5341. The second abutment face 5321 is formed around the second forming face 5341.

The sleeve member 54 has a sleeve wall 541 defining a slot 542. The slot 542 has a first slot section 5421 having a diameter (D3) smaller than an outer diameter (D1) of the glass blank 200, a second slot section 5422 with a diameter (D4) larger than an outer diameter (D2) of the lens 300, and a third slot section 5423 formed between the first and second slot sections 5421 and 5422 and having a diameter (D5) substantially corresponding to the diameter D1 of the glass blank 200. The sleeve wall 541 has a third abutment face 5411 to abut against the first abutment face 5221, a fourth abutment face 5412 to abut against the second abutment face 5321, a first shoulder face 5413 formed between the first and third slot sections 5421, 5423 to support the glass blank 200, and a second shoulder face 5414 formed between the second and third slot sections 5422 and 5423 to support the lens 300. The third and fourth abutment faces 5411 and 5412 are formed respectively at the bottom and top sides of the sleeve wall 541.

The suction device 60 is provided outside the forming room 10 adjacent to the entrance opening 11. In this embodiment, the suction device 60 includes a suction nozzle (not shown) operable to suck each glass blank 200 or each lens 300 through a suction force.

Figure 7:
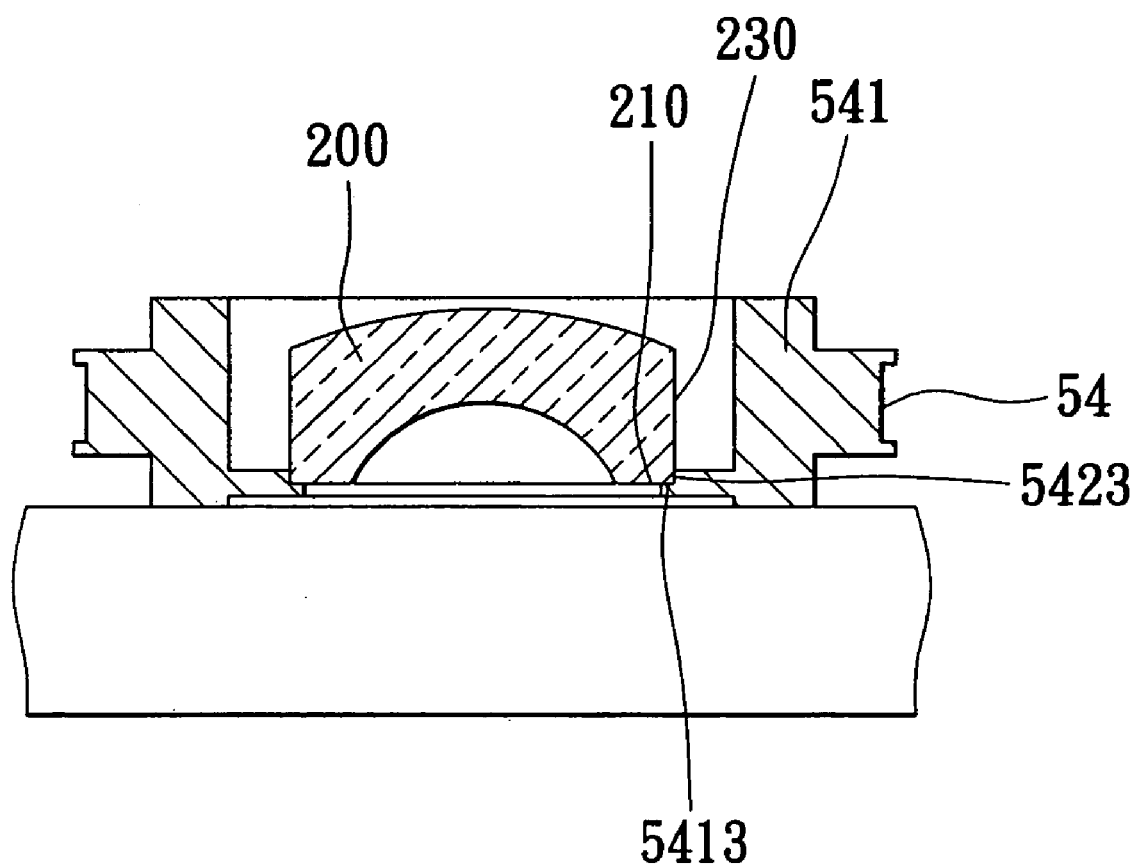
FIG. 7 is an enlarged view of another encircled portion of FIG. 5 showing that a glass blank is supported by a sleeve member.

Referring to FIG. 7, at the beginning of the operation, the glass blank 200 is placed in the sleeve member 54 with the bottom face 210 thereof seated against the first shoulder face 5413 so that the periphery 230 of the glass blank 200 is in contact with the wall of the third slot section 5423.

Referring once again to FIGS. 2 to 6, when each sleeve member 54 together with the glass blank 200 is turned to the first heating region 24 from the reception region 23, the glass blank 200 is preheated. Thereafter, the preheated glass blank 200 together with the sleeve member 54 is turned to the first transfer region 25, where the sleeve member 54 is picked up by the pick-up device 40 for transfer to the second transfer region 34. In the second transfer region 34, the sleeve member 54 is assembled between the upper and lower mold units 53 and 52. At this time, the third abutment face 5411 of the sleeve member 54 abuts with the first abutment face 5221 of the lower socket member 522. Since, after assembly, the first forming face 5241 of the lower molding core 524 is higher then the second shoulder face 5414 of the sleeve wall 541, the bottom face 210 of the glass blank 200 is raised by the first forming face 5241, thus separating the bottom face 210 from the first shoulder face 5413. When each forming unit 51 with the glass blank 200 is turned to the second heating region 35 from the second transfer region 34, the glass blank 200 is heated and softened. Subsequently, the softened glass blank 200 with the forming unit 51 is turned to the forming regions 36 where the upper mold unit 53 is moved downward by the drive member 33 until the second abutment face 5321 of the upper socket member 532 is in abutment with the fourth abutment face 5412 of the sleeve wall 541. The glass bank 200 is therefore formed into the lens 300 with a predetermined thickness. The first one of the forming regions 36 provides a predetermined thickness to the lens 300, whereas another forming region 36 is used to ensure the accuracy of profile formation for the lens 300. After forming, the bottom face 310 of the lens 300 extends to a level proximate to the second shoulder face 5414 as shown in FIG. 6.

Figure 8:
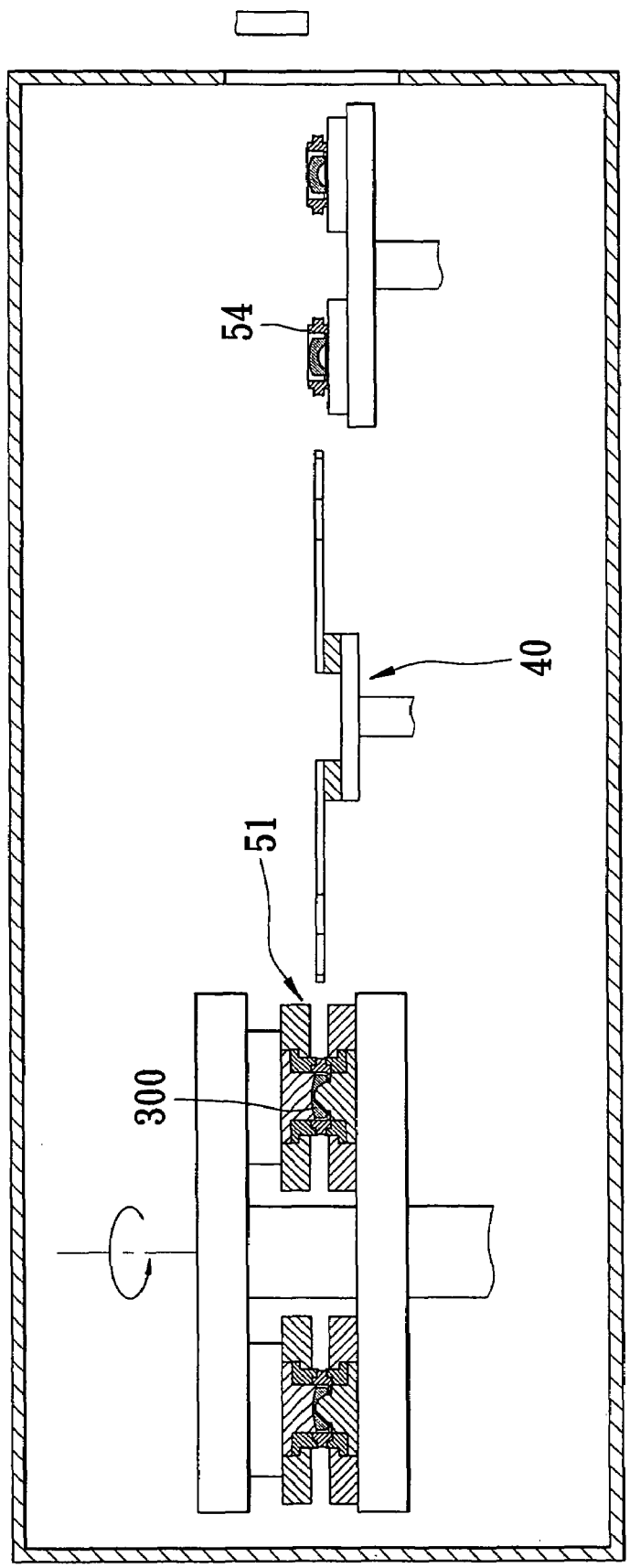
FIG. 8 is the same view as FIG. 3 but with the forming unit being moved from the forming region to a second cooling region.
Figure 9:
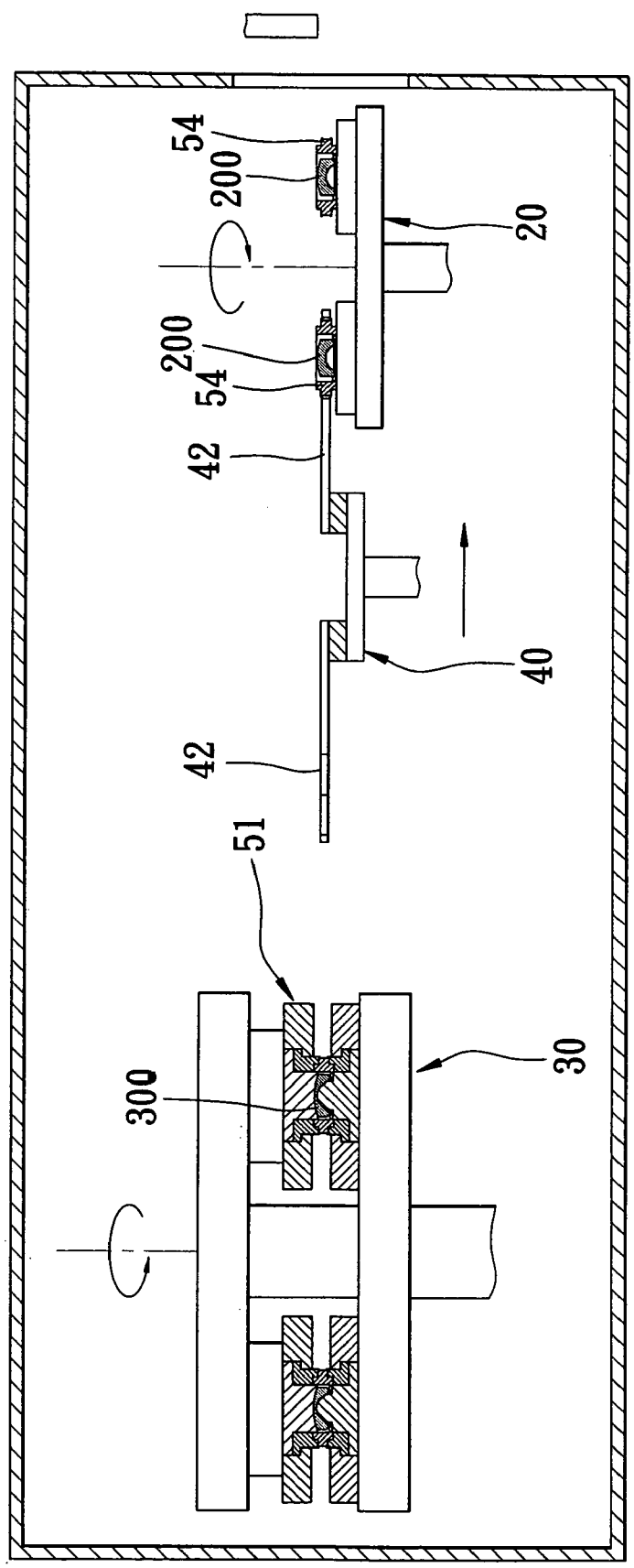
FIG. 9 is the same view as FIG. 3 but with the forming unit being moved from the second cooling region to a second transfer region and with a pick-up device being moved to a first rotating device.

Referring to FIG. 8 in combination with FIG. 2, when the forming unit 51 with the lens 300 is turned from the forming regions 36 to the second cooling region 37, the lens 300 is cooled so that it shrinks. Referring to FIG. 9 in combination with FIG. 2, when the second rotating device 30 is turned to move the forming unit 51 to the second transfer region 34 from the second cooling region 37, one of the sleeve members 54 on the first rotating device 20 is moved to the first transfer region 25 from the first heating region 24. In this state, the pick-up device 40 moves to the first rotating device 20 and one of the clamp 42 picks up the sleeve member 54 from the first transfer region 25.

Figure 10:
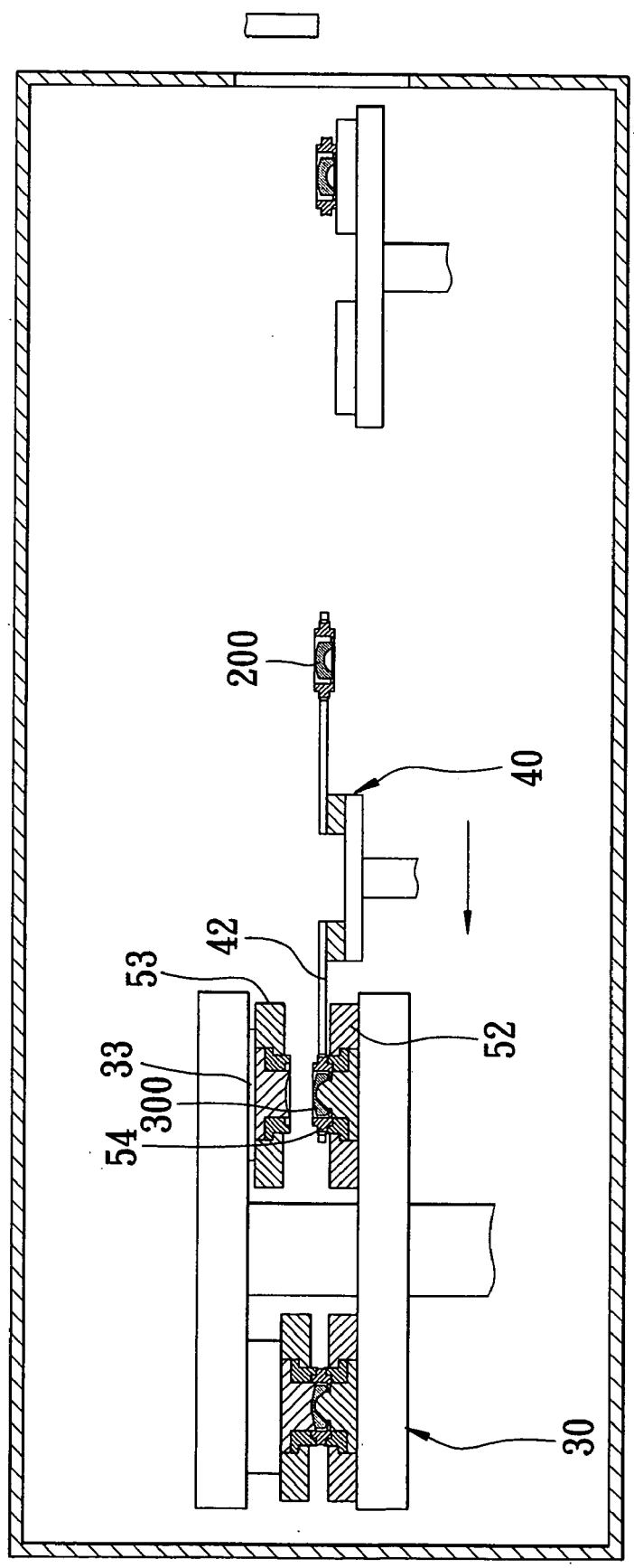
FIG. 10 is the same view as FIG. 3, but with the pick-up device being moved to the second rotating device to pick-up the sleeve member.
Figure 11:
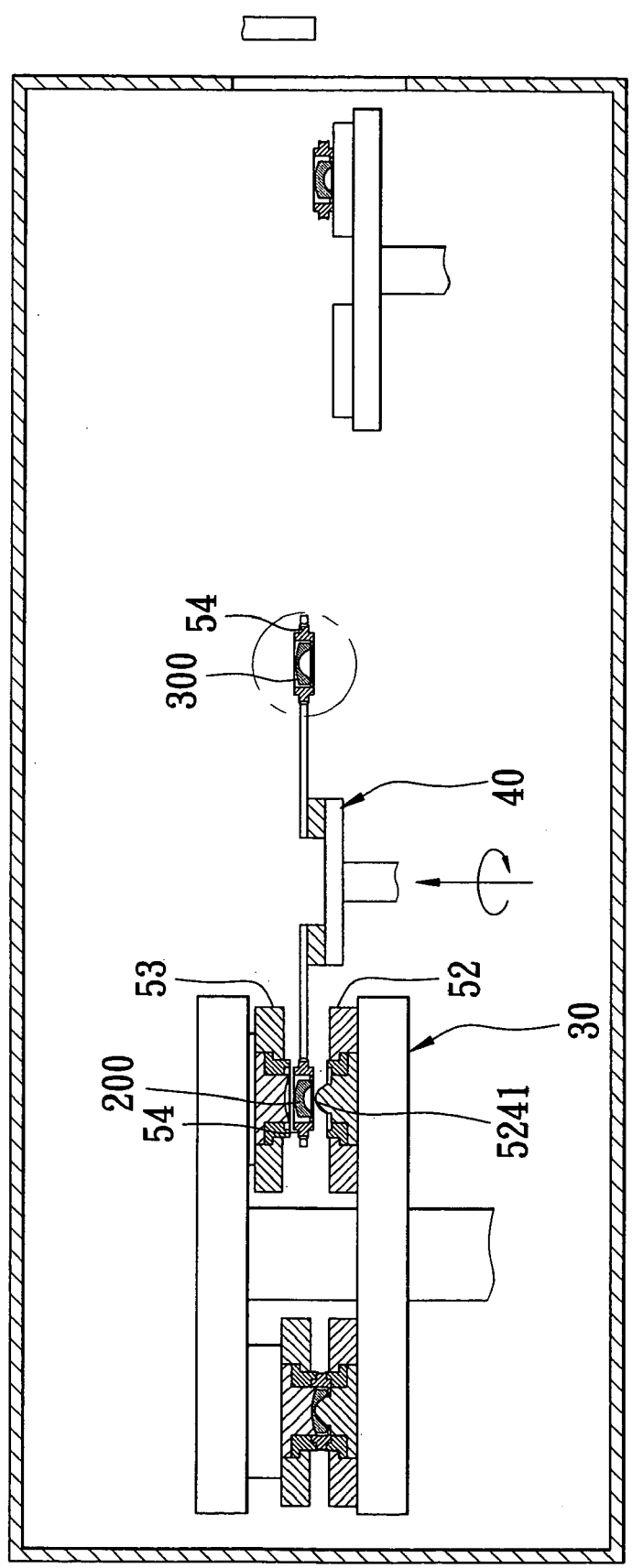
FIG. 11 is the same view as FIG. 3 but with the pick-up device being turned to change the position of the sleeve member.
Figure 12:
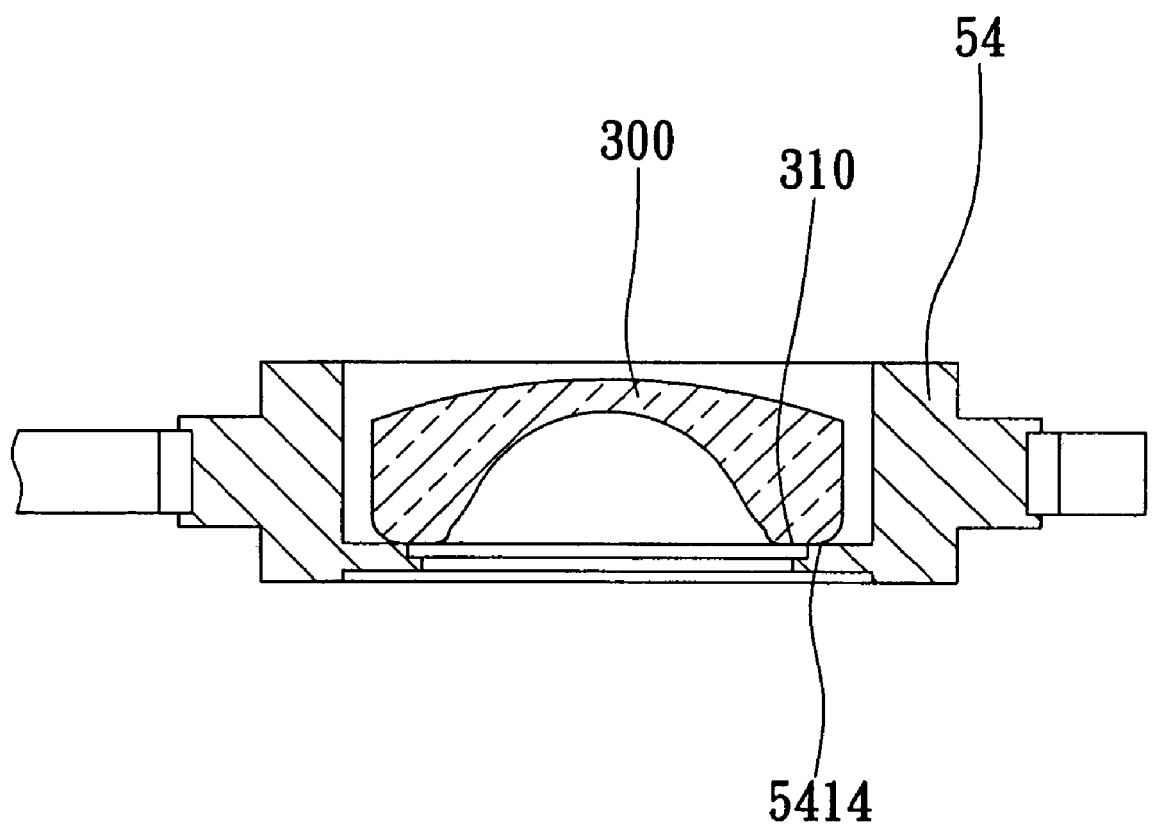
FIG. 12 is an enlarged view of an encircled portion of FIG. 11.

Referring to FIG. 10, the drive member 33 in the second transfer region 34 moves the upper mold unit 53 away from the sleeve member 54 and the lens 300. At this time, the pick-up device 40, which has picked up the sleeve member 54 from the first transfer region 25, moves to the second rotating device 30 and picks up the sleeve member 54 from the lower mold unit 52 with another clamp 42. Subsequently, the pick-up device 40 moves upward so that the sleeve member 54 together with the lens 300 is separated from the lower mold unit 52. Thereafter, the pick-up device 40 rotates to interchange the positions of the lens 300 and the glass blank 200 so that the lens 300 with the corresponding sleeve member 54 is moved away from the upper and lower mold units 53, 52 of the second transfer region 34 and so that the glass blank 200 with the corresponding sleeve member 54 is moved to the upper and lower mold units 53, 52 on the second rotating device 30, as shown in FIG. 11. At this juncture, the second shoulder face 5414 of the sleeve member 54 supports the bottom face 310 of the lens 300, as shown in FIG. 12.

Figure 13:
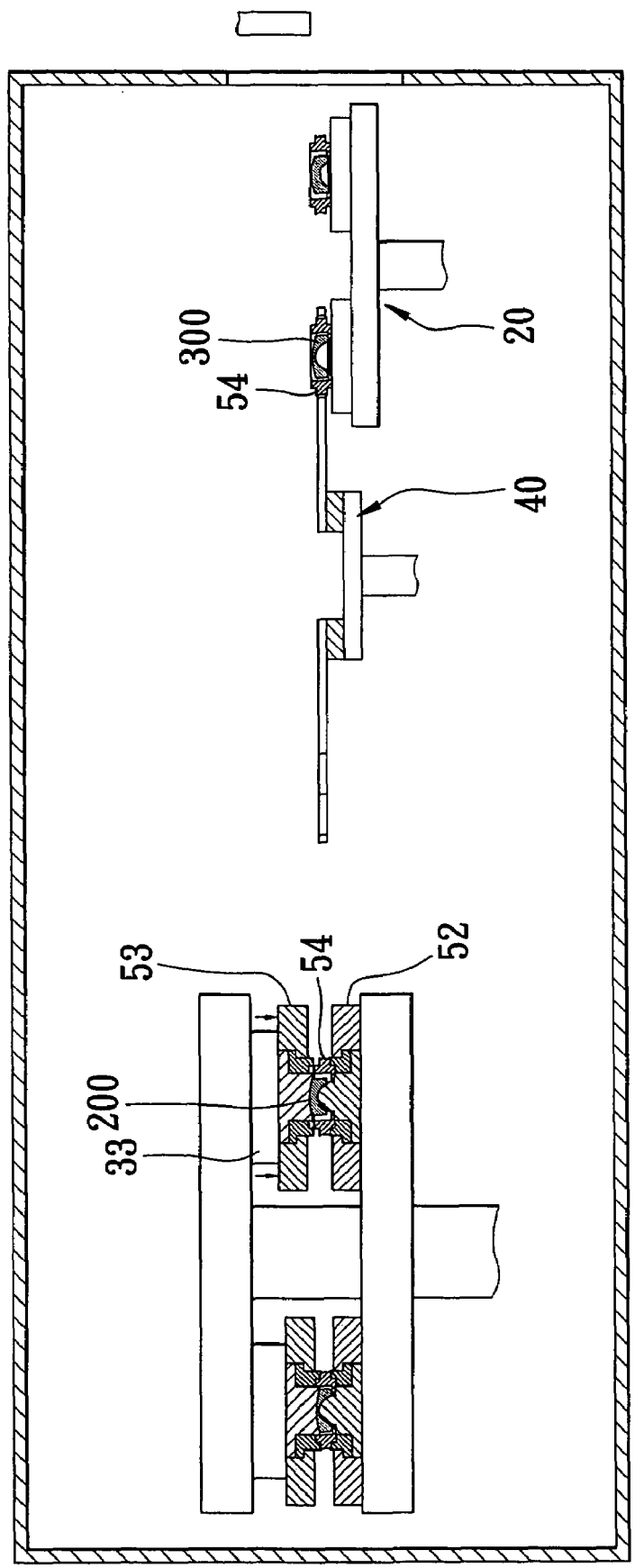
FIG. 13 is the same view as FIG. 3 but with the pick-up device being moved to the first rotating device.

Referring to FIG. 13, in the next step, the pick-up device 40 moves downward to place the glass blank 200 on the lower mold unit 52, and the corresponding upper mold unit 53 is moved downward by the drive member 33 to press the glass blank 200. When the pick-up device 40 moves to the first rotating device 20, the sleeve member 54 which holds the lens 300 is placed on the first rotating device 20.

Figure 14:
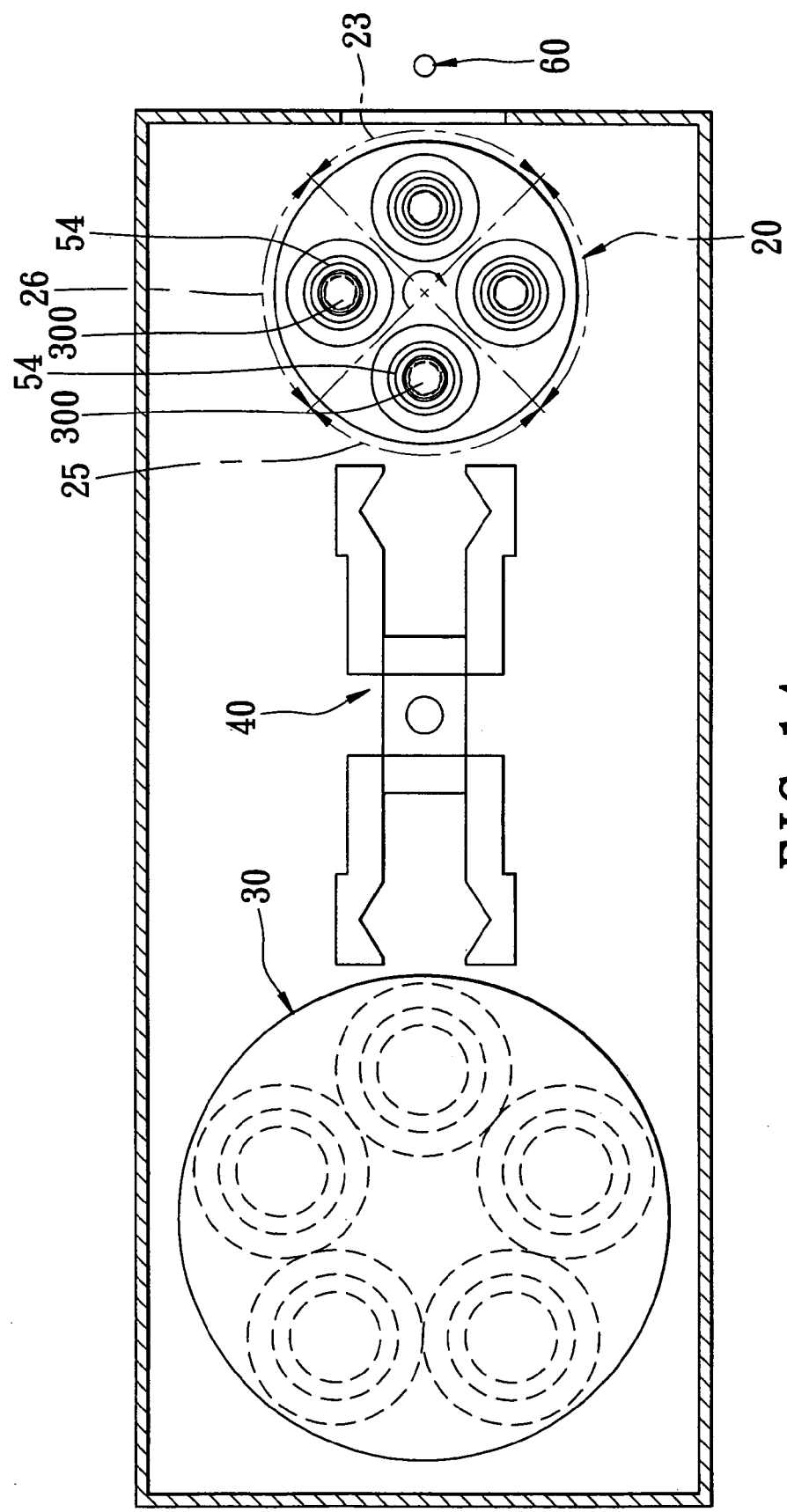
FIG. 14 is the same view as FIG. 2, but with one of the sleeve members which holds the lens being moved from a first transfer region to a first cooling region.
Figure 15:
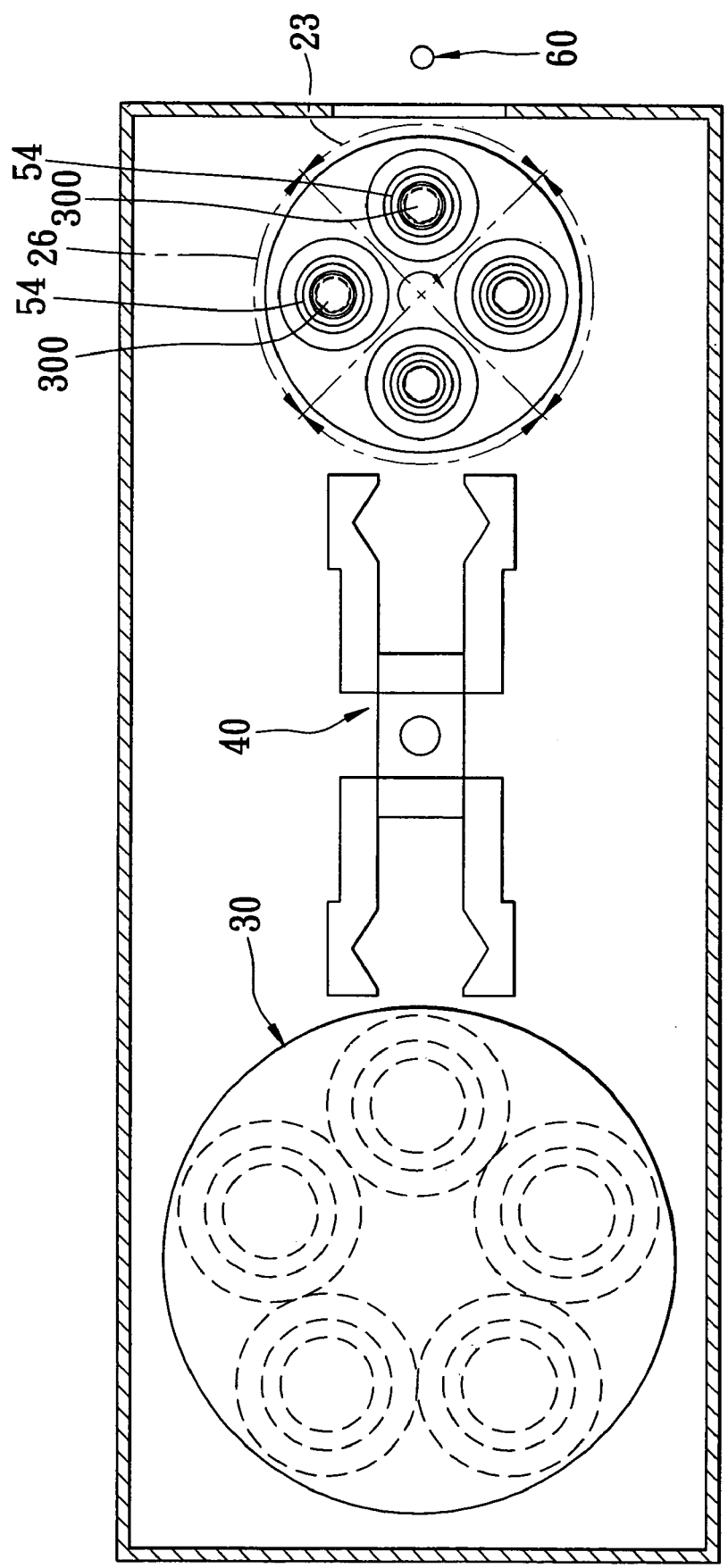
FIG. 15 is the same view as FIG. 2 but with the lens and the corresponding sleeve member being moved to a reception region from the first cooling region.
Figure 16:
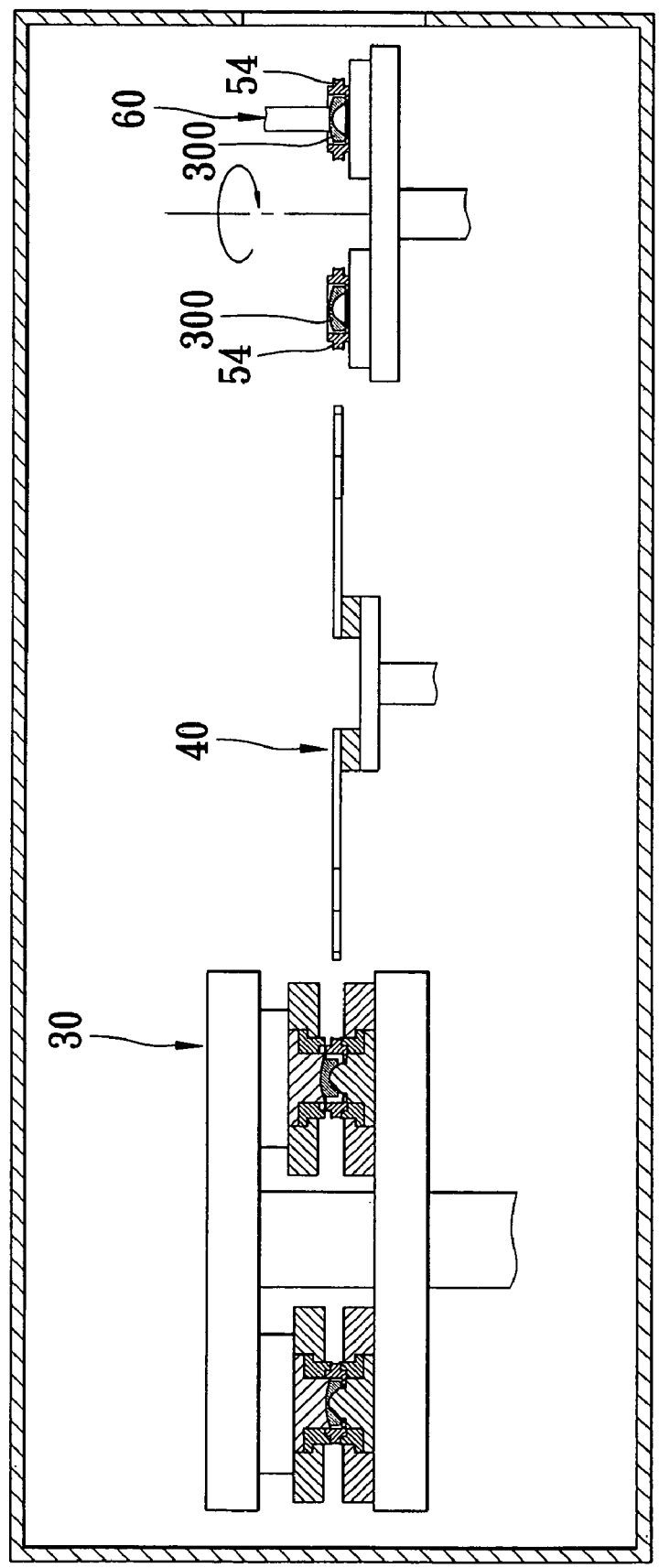
FIG. 16 is the same view as FIG. 3 but with a suction device being lowered to suck the lens.

Referring to FIG. 14, when the lens 300 with the sleeve member 54 is turned from the first transfer region 25 to the first cooling region 26, the lens 300 is cooled down so that the shape thereof is fixed. Finally, the sleeve member 54 and the lens 300 are moved from the first cooling region 26 to the reception region 23, and the suction device 60 sucks the lens 300 from the sleeve member 54 and transfers it to a storage zone (not shown), as shown in FIGS. 15 and 16. Afterward, another glass blank 200 from a material preparation zone (not shown) is placed on the sleeve member 54 by the suction device 60, as shown in FIG. 2.

As mentioned above, the sleeve members 54 of the forming device 50 are moved from the reception region 23 to the first heating region 24 and the first transfer region 25, and then transferred to the second transfer region 34 by the pick-up device 40. Thereafter, the sleeve members 54 are rotated to the second heating region 35, the forming regions 36 and the second cooling region 37 and returned to the second transfer region 34. Finally, the sleeve members 54 are returned to the first reception region 23. In this way, a continuous forming process can be carried out by the forming system of the present invention to form glass blanks 200 into lenses 300.

The advantages of the present invention are as follows:

1. Compared to the conventional forming system which requires 14 sets of forming units 104 for producing continuously a piece of lens 106, only 5 sets of forming units 51 are needed in the present invention for the continuous production of a piece of lens 300. Not only the production rate is increased, but also the production cost is also reduced in the present invention.

2. In the present invention, since the upper and lower mold units 53, 52 of each forming unit 51 are disassembled and assembled in the same region, i.e. the second transfer region 34, the operation steps for transferring the forming unit 51 is simplified. Furthermore, because alignment and positional correction of the upper and lower mold units 53, 52 are made only one time for each forming unit 51, the frequency of the operation for alignment and position correction of the upper and lower mold units 53, 52 can be reduced, thereby decreasing the incidence of misalignment and inferior product formation.

3. As shown in FIG. 7, when the glass blank 200 is placed on the first shoulder face 5413 of the corresponding sleeve member 54, the peripheral face 230 of the glass blank is limited within the third slot section 5423. As such, when the suction device 60 places the glass blank 200 in the corresponding sleeve member 54, or when the pick-up device 40 takes the sleeve member 54 and the glass blank 200 from the first rotating device 20 to the second rotating device 30, the center of the glass blank 200 will not deviate from the center of the corresponding sleeve member 54. Accordingly, the sleeve member 54 together with the glass blank 200 can be centered easily with respect to the upper and lower mold units 53, 52. As a result, the yield of good quality products can be increased.

Figure 17:
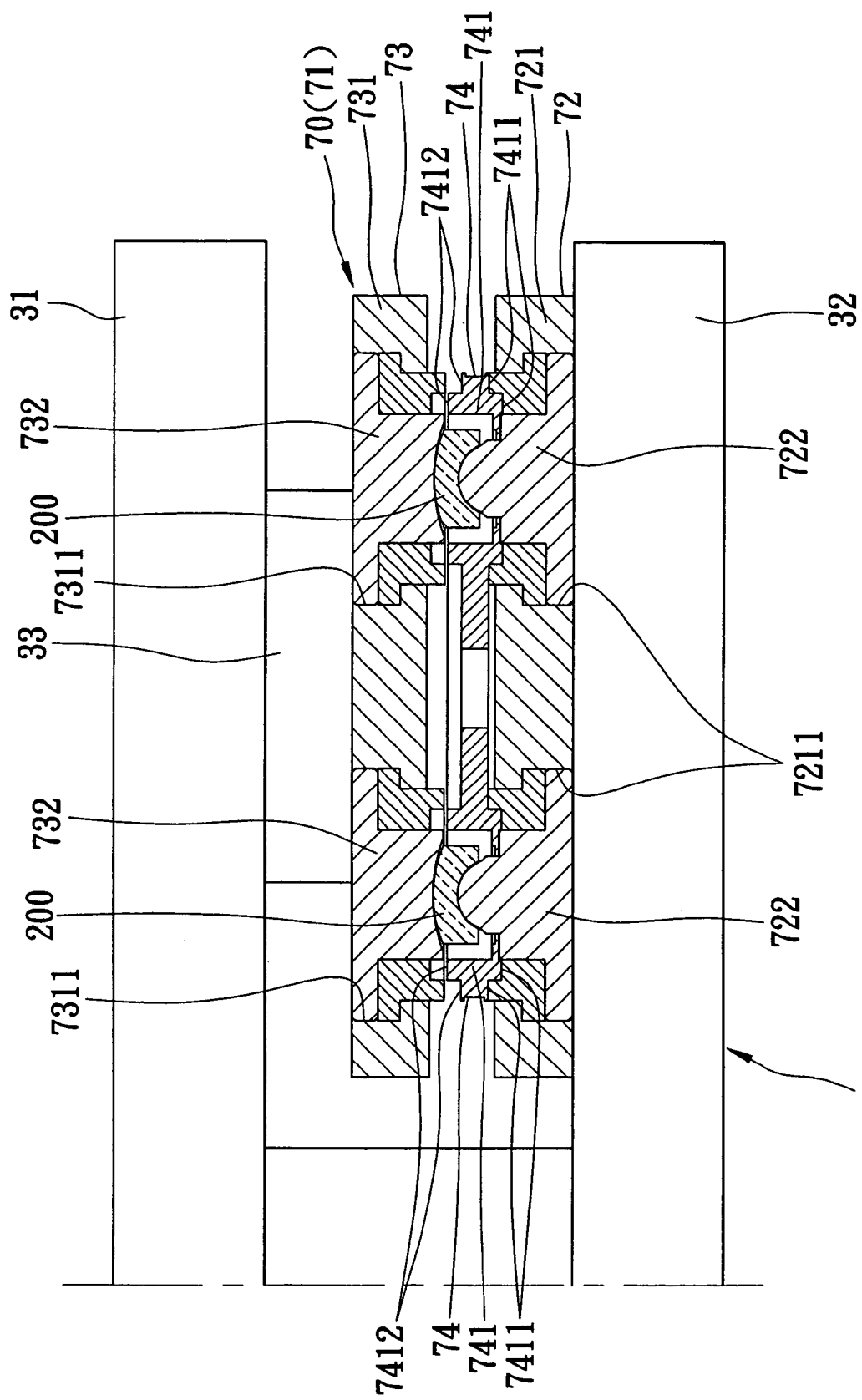
FIG. 17 is a sectional view showing a forming unit of another forming system embodying the present invention.
Figure 18:
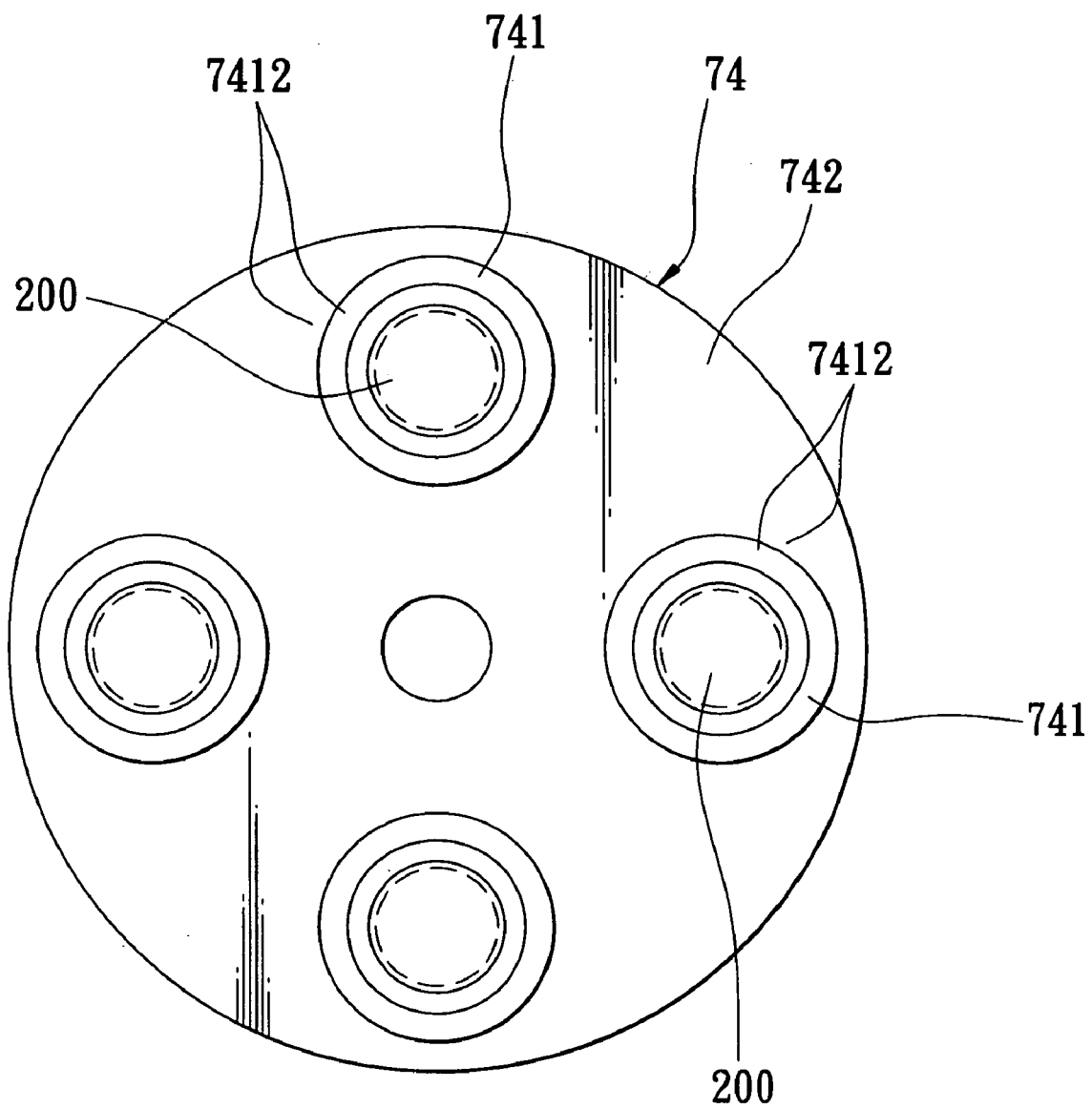
FIG. 18 is a plan view of the forming unit of FIG. 17.
Figure 19:
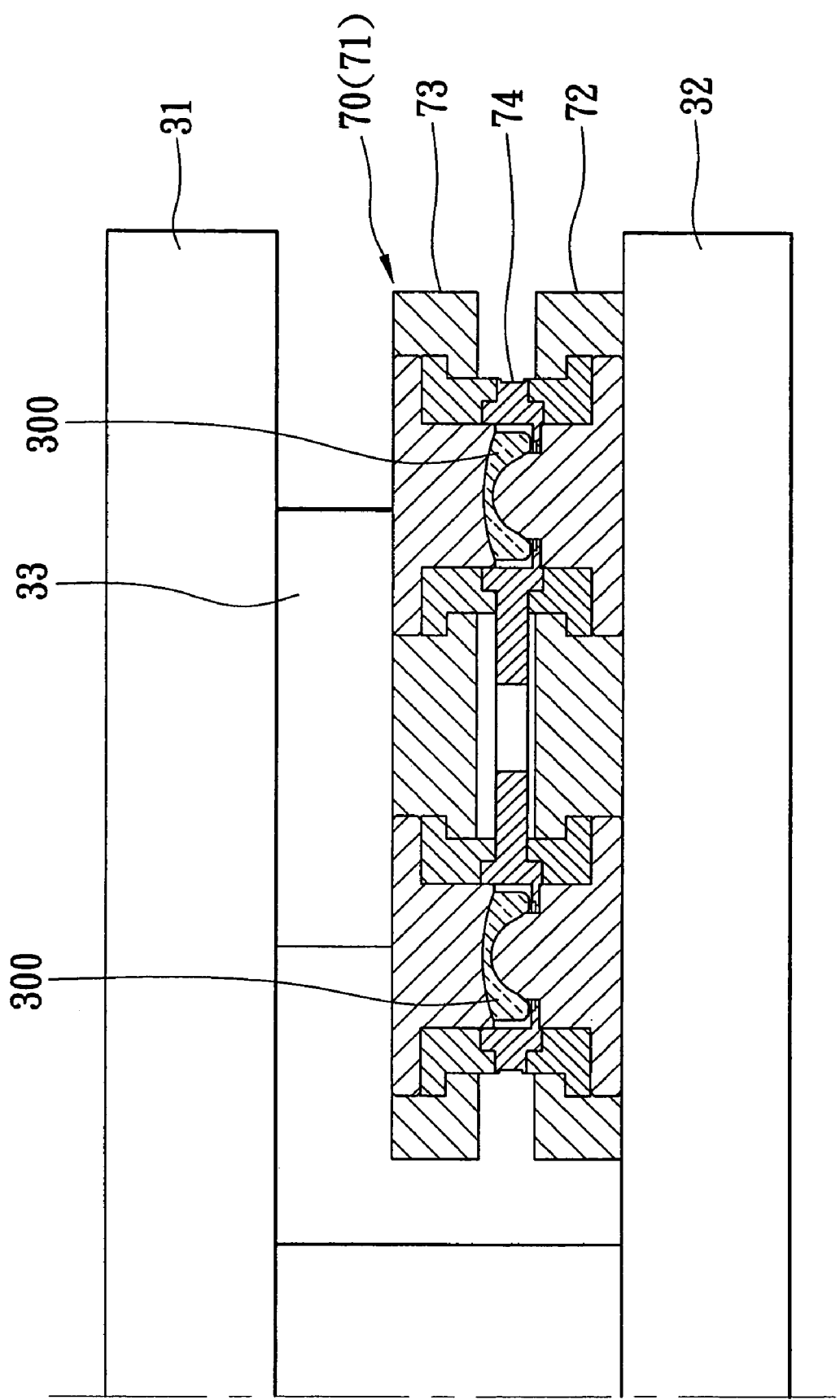
FIG. 19 is the same view as FIG. 17 but with a glass blank being formed into a lens.
Figure 20:
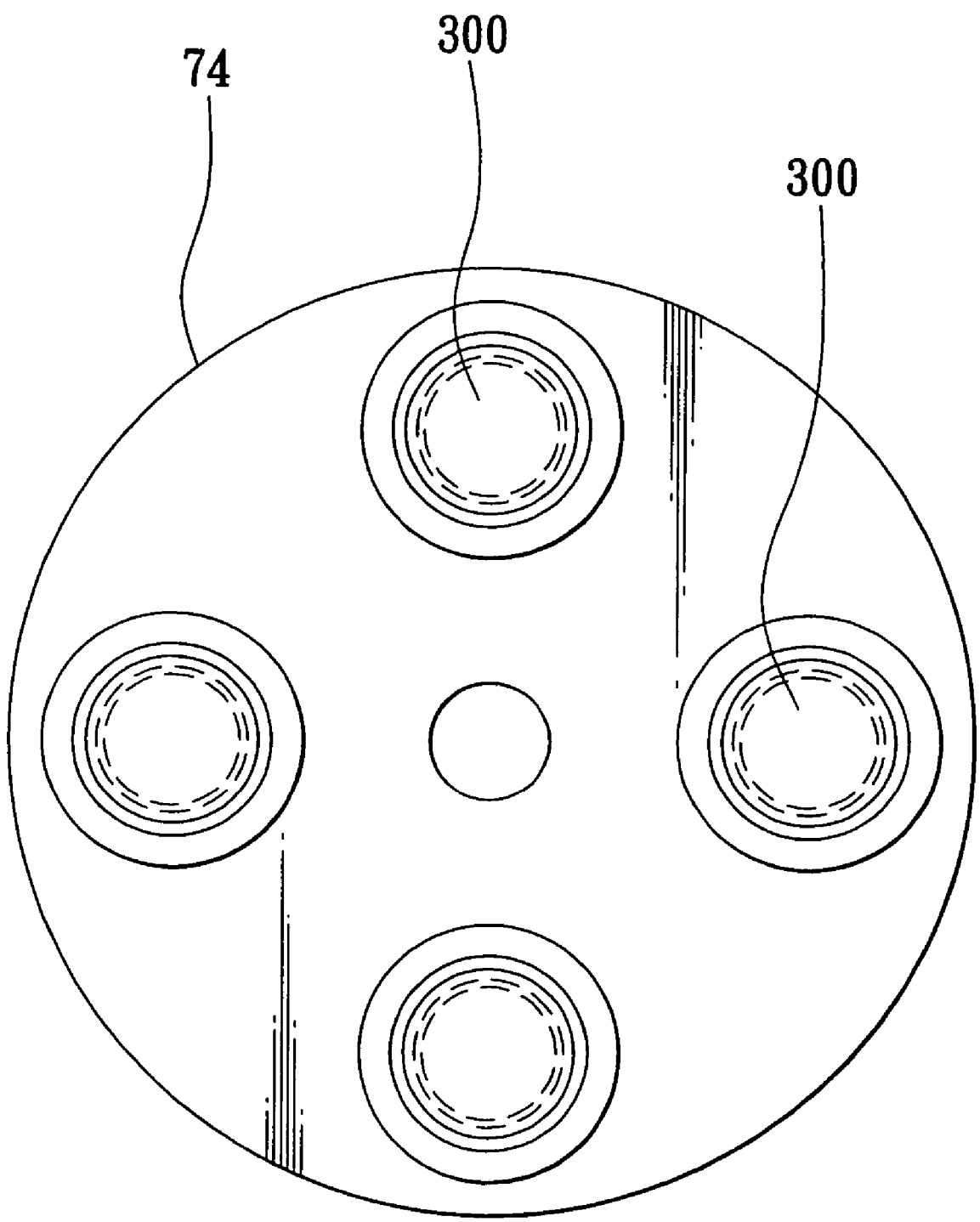
FIG. 20 is the same view as FIG. 18 but showing that sleeve members of the forming unit are holding lenses.

Referring to FIGS. 17 and 18, another preferred embodiment of the present invention is shown to be substantially similar to the first preferred embodiment except the following differences:

Compared to the previous embodiment in which only one glass blank 200 is processed at each time of operation, this embodiment permits simultaneous formation of a plurality of glass blanks 200 having a small outer diameter (FIGS. 17 and 18) into a plurality of lenses 300 having a large outer diameter (see FIGS. 19 and 20).

Unlike the forming device 50 of the previous embodiment in which each of five forming units 51 includes one single lower molding core 524 and one single upper molding core 534, the forming device 70 of this embodiment includes five forming units 71 each of which has a set of lower molding cores 722 and a set of upper molding cores 732 for simultaneous production of a plurality of lens 300 from glass blanks 200. In particular, each forming unit 71 includes a lower mold unit 72 and an upper mold unit 73. The lower mold unit 72 is mounted on the lower rotary part 32 of the second rotating device 30, whereas the upper mold unit 73 is mounted on the drive member 33.

The lower mold unit 72 includes a plurality of interconnected lower molding cores. Specifically, a lower support plate 721 is mounted on the lower rotary part 32 of the second rotating device 30, and four lower molding cores 722 (only two are shown) are fitted respectively in cavities 7211 of the lower support plate 721. Assembly of the lower molding cores 722 in the lower support plate 721 is similar to that of the lower molding cores 524 of the previous embodiment and will not be detailed hereinafter.

The upper mold unit 73 includes a plurality of interconnected upper molding cores. Specifically, an upper support plate 731 is mounted on the drive member 33 which in turn is mounted on the second rotating device 30, and four upper molding cores 732 (only two are shown) are fitted respectively in cavities 7311 of the upper support plate 731. Assembly of the upper molding cores 732 with the upper support plate 731 is similar to that of the upper molding cores 534 of the previous embodiment and will not be detailed hereinafter.

The sleeve members 74 in this embodiment differ from the sleeve members 54 of the previous embodiment in that each sleeve member 74 includes a plurality of sleeve walls 741, specifically four sleeve walls 741, which are interconnected by a connecting web 742, as shown in FIGS. 18 and 20. Each sleeve member 74 is mountable between the lower and upper mold units 72 and 73. The third abutment faces 7411 of the sleeve walls 741 are formed at the bottom side of the connecting web 742, and the fourth abutment faces 7412 of the sleeve walls 741 are formed at the top side of the connecting web 742.

Following the procedure of the first embodiment, the forming system of this preferred embodiment can form a number of glass blanks 200 (FIGS. 17 and 18) into lenses 300 (FIGS. 19, 20) in one time. Since several lenses 300 can be placed simultaneously in an annealing furnace (not shown), unlike the conventional process, it is not necessary to place the lenses 300 one after the other on a tray (not shown) for feeding into an annealing furnace.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A continuous forming system for glass, comprising:
  a first processing station defining a reception region, a first heating region, a first transfer region, and a first cooling region which are arranged successively along a first angular direction, and including a first rotating device rotatable along said first angular direction to move through said reception region, said first heating region, said first transfer region, and said first cooling region;

a second processing station defining a second transfer region, at least one second heating region, at least one forming region and at least one second cooling region which are arranged successively along a second angular direction, and including a second rotating device rotatable along said second angular direction to move through said second transfer region, said second heating region, said forming region and said second cooling region;

said second rotating device disposed in said second processing station for rotating along a second direction so as to move between said second transfer region, said second heating region, said forming region and said second cooling region, said second rotating device including a lower rotary part and an upper rotary part disposed above said lower rotary part;

a forming device including at least one forming unit which is mounted on said second rotating device for moving between said second transfer region, said second heating region, said forming region, and said second cooling region, said forming device further including at least one sleeve member which is mountable on said first rotating device for moving between said reception region, said first heating region, said first transfer region and said cooling region and which is movable to said second rotating unit for cooperating with said forming unit, said forming unit having a lower mold unit mounted on said lower rotary part, and an upper mold unit mounted on said upper rotary part to move toward and away from said lower mold unit, said sleeve member being mountable between said lower and upper mold units, said sleeve member including at least one sleeve wall defining a slot, said sleeve wall having a first shoulder face formed around said slot and adapted to support a glass blank, and a second shoulder face formed around said slot above said first shoulder face and adapted to support a lens; and a pick-up device provided between said first and second transfer regions and between said first and second rotating devices to transfer said sleeve member between said first and second rotating devices.

2. The continuous forming system as claimed in claim 1, wherein said forming device further includes a drive member mounted on said upper rotary part and connected to said upper mold unit so as to move said upper mold unit.

3. The continuous forming system as claimed in claim 1, wherein said pick-up device includes an opposed pair of clamps each of which is turnable between said first and second transfer regions.

4. The continuous forming system as claimed in claim 1, wherein said second processing station includes two of said second heating regions and two of said second cooling regions provided successively along said second rotating direction.

5. The continuous forming system as claimed in claim 4, wherein said forming device includes a plurality of said forming units mounted on said second rotating device at angularly spaced-apart positions corresponding to the positions of said second transfer, second heating and second cooling regions, each of said forming units being movable between said second transfer, second heating and second cooling regions.

6. The continuous forming system as claimed in claim 5, wherein said forming device includes a plurality of said sleeve members which are placed on said first rotating device at angularly spaced-apart positions corresponding to the positions of said reception, first heating, first cooling and first transfer regions, said sleeve members being movable between said reception, first heating, first cooling and first transfer regions and between said first and second rotating devices.

7. The continuous forming system as claimed in claim 6, further comprising a suction device disposed adjacent said reception region and adapted to move a glass blank into one of said sleeve members or move a lens away from one of said sleeve members.

8. The continuous forming system as claimed in claim 1, wherein said lower mold unit includes a first forming face, and a first abutment face around said first forming face, said upper mold unit including a second forming face opposite to said first forming face and a second abutment face around said second forming face, said slot of said sleeve member including a first slot section, a second slot section having a cross-section larger than that of said first slot section, and a third slot section formed between said first and second slot sections and having a cross-section corresponding to that of the glass blank, said first shoulder face being defined on said sleeve wall between said first and third slot sections, said second shoulder face being defined on said sleeve wall between said second and third slot sections, said sleeve wall further including opposite third and fourth abutment faces to respectively abut against said first and second forming faces when said sleeve member is assembled between said lower and upper mold units, said first forming face being higher than said second shoulder face after assembly.

9. The continuous forming system as claimed in claim 8, wherein said lower mold unit further includes a lower hollow support mounted on said lower rotary part, a lower socket member mounted within said lower hollow support, a lower molding core inserted into said lower socket member, said first forming face being formed on top of said lower molding core, said first abutment face being formed on top of said lower socket member.

10. The continuous forming system as claimed in claim 9, wherein said second rotating device further includes a drive member mounted on said upper rotary part, said upper mold unit including an upper hollow support mounted on said drive member, an upper socket member mounted within said upper hollow support, and an upper molding core inserted into said upper socket member, said second forming face being formed on a bottom end of said upper molding core, said second abutment face being formed on a bottom end of said upper socket member, said drive member being operable to move said upper mold unit toward and away from said lower mold unit.

11. The continuous forming system as claimed in claim 10, wherein said third and fourth abutment faces are respectively formed on bottom and top ends of said sleeve member which are opposite to said lower and upper mold units, respectively.

12. The continuous forming system as claimed in claim 1, wherein said lower mold unit includes a single lower molding core with a first forming face, said upper mold unit including a single upper molding core with a second forming face to cooperate with said first forming face, said sleeve member being mountable between said lower and upper molding cores.

13. The continuous forming system as claimed in claim 1, wherein said lower mold unit includes a plurality of interconnected lower molding cores each of which has a first forming face, said upper mold unit including a plurality of interconnected upper molding cores each of which has a second forming face to cooperate with said first forming face, said sleeve member including a plurality of said sleeve walls which are interconnected and each of which is mountable between one of said lower molding cores and one of said upper molding cores.

* * * * *